United States Patent Office 3,050,473
Patented Aug. 21, 1962

3,050,473
POLYMERIZATION CATALYST
Jacque C. Morrell, 8 Oxford St., Chevy Chase, Md.
No Drawing. Filed Mar. 23, 1959, Ser. No. 800,948
5 Claims. (Cl. 252—435)

This invention relates to polymerization catalysts and more particularly to improvements in those types of polymerization catalysts which contain as their principal ingredients a phosphoric acid and a natural porous silica material. The latter material is generally referred to as kieselguhr or infusorial earth and sometimes also as diatomaceous earth. In its most specific aspect my invention relates to improvements of the compression strength and hardness, and in general the wearing qualities of such polymerization catalysts which is at present a most important problem.

The catalysts produced from such mixtures of phosphoric acid and porous silica material, after baking and/or drying the same, have proven to be the best available catalysts for the polymerization of normally gaseous olefins to produce liquid hydrocarbon components of high octane motor and aviation fuels. The polymerization process has for a great many years been one of the most useful and important in the economy of petroleum refining for the conversion of otherwise practically waste gases resulting from both thermal and catalytic cracking into valuable components of motor fuels. The catalyst itself is highly active for the purpose, but its outstanding weakness has been its poor wearing qualities and its tendency to crumble and to dust during handling and use. This results in a relatively short life and frequent turnover of catalyst with the attendant increased costs. Despite the many years that this problem has existed and the many attempts to solve it, no satisfactory solution has been available to the industry and it is a prime object of the present invention to relieve the refining industry of the problem.

The polymerization catalysts described in my Patents Nos. 2,586,582 and 2,713,560 consisting of kaolin and phosphoric acid were an improvement so far as wearing qualities were concerned but the sacrifice in activity was too great to be economically feasible. Various other solutions of the problem are disclosed in copending applications, some of which are continuations-in-part of the applications upon which these patents issued; and others are independent thereof. The catalyst products of these various applications consist in a very minor amount of an additive combined with a major amount of a natural porous silica material such as kieselguhr and these in turn are combined with a much larger proportion of a phosphoric acid, e.g. the latter may comprise from 75% to 85% and preferably in excess of 80% of the mixture. The final product is dried and baked. Thus a balance between wearing qualities and activity is achieved.

In carrying out the objects of my invention I incorporate from about 3% to about 15% (and preferably from about 5% to 10%) of iron oxide or of a compound of iron which may react with phosphoric acid, particularly a soluble salt of iron such as the sulphate, acetate and the like, or of iron phosphate itself with about 85% to 97% of a natural porous silica material of the class consisting of kieselguhr, infusorial earth and diatomaceous earth, which mixture I may refer to as the mineral mix. The latter may then be incorporated with a phosphoric acid employing about 20% of the mineral mix and the maximum amount of a phosphoric acid, e.g. up to 80% and above which will give the proper mixture consistency to be extruded and heated without flowing and to achieve a proper balance between catalyst hardness and compression strength on the one hand and activity of the phosphoric acid on the other at a reasonable cost. The final catalyst will thus contain from about 1% (or less) to about 3% of the additive based on the total with a preferred ratio of the mineral mix to phosphoric acid of about 20% of the former to about 80% or above of the latter. The latter percentages may, however, vary from about 75% to 85% of phosphoric acid (calculated to 100% concentration) (and in a more narrow range of 78% to 82%) with corresponding changes in the mineral mix. The additive on the other hand may vary from ½% to 5% and above (in any event less than about 10%) of the final catalyst either as such or in terms of the reaction products of the additive with the phosphoric acid.

The various components may be mixed in one of several ways, (a) the additive may be added directly to the phosphoric acid; or to the kieselguhr; or to the mixture of phosphoric acid and kieselguhr as a final step. However, when the iron oxide in the form of ferric oxide ($Fe_2O_3$) is employed, it has been found preferable to mix it direct with kieselguhr and thereafter from the viewpoint of workability of the mixture, that, is the extrusion and subsequent heating of the product, to mix with the phosphoric acid.

The mixture may be cut to proper size after extrusion (or broken into proper sizes after heating) and is then dried or baked at temperatures varying from 500° F. to 800° F. depending on the phosphoric acid content for about four hours or longer. Catalysts with about 78% to 80% phosphoric acid may be heated from about 600° F. to 700° F. and those above 80% from 750° F. to 800° F. and above.

The compounds of iron which I employ may be any one which reacts with the phosphoric acid (at some stage of preparation) but are preferably those which do not form objectionable gaseous products like hydrogen chloride oxides of nitrogen and the like. From the practical viewpoint, especially in connection with extrusion of the product and being able to heat it without deformation and flowing, the red oxide ($Fe_2O_3$) is preferred. In this connection I may utilize iron phosphate directly or the mineral hematite and corresponding hydrated oxide limonite (and bog iron ore, etc.). I may also employ the natural iron carbonate mineral (siderite) as well as the prepared carbonate but when the latter are employed, they are added direct to the phosphoric acid to avoid excess evolution of carbon dioxide and excessive porosity, as a result of later heating.

I may also employ such iron minerals as magnetite (and others) but the physical form of the red oxide is preferred to this.

I may also employ the soluble salts such as the sulphate, acetate, and others, by adding the same direct to the phosphoric acid in which case the iron phosphate may be said to be formed in "situ," which may also be the case with the oxides at the higher temperature as the red color disappears during the heating stage.

From the above discussion, it will be observed that there is a great difference in composition of my catalyst compared with the prior art, and at the same time there is a wholly unexpected and marked improvement in the hardness and compression strength of the catalyst containing essentially only the kieselguhr and phosphoric acid while at the same time retaining the high activity of the latter composition. The catalysts of the present invention are different and greatly superior in all essential respects to those of the prior art, both from the viewpoint of composition as well as properties and utility.

The porous silica ($SiO_2$) material, kieselguhr, as well as (infusorial earth and diatomaceous earth) are also quite different from kaolin both in chemical and physical characteristics and properties. They lack plasticity and the property of hardening which kaolin possesses. The latter (sometimes called china clay) is composed of silicon, oxygen and hydrogen corresponding to the general formula $Al_2O_3.2SiO_2.2H_2O$. It is derived from the weathering of feldspars. Kieselguhr (etc.) on the other hand is made up of the skeletal remains of diatoms and is essentially $SiO_2$. The two materials also differ in crystal structure and X-ray pattern. In fact, there are no similarities between kaolin and kieselguhr so that a composition containing only one of them is entirely different from the other. I disclose the use of kaolin and other substances in copending application to supply the deficiency in kieselguhr-phosphoric polymerization catalysts in respect of hardness and compression strength and wearing qualities or catalyst life in general, but they are, of course, entirely different from each other as well as from the iron compounds mentioned herein.

The terms kieselguhr, infusorial earth and diatomaceous earth (also tripolite) are used interchangeably, for example in Hack's Chemical Dictionary (1929), and all three terms are defined as a light earthy sedimentary rock consisting of the microscopic empty shells of diatoms. Infusorial earth, kieselguhr, diatomite, tripolite, diatomaceous earth-siliceous earth are similarly used interchangeably and are referred to as—a fine powder composed of siliceous skeletons of diatoms sp. gr. 0.24–0.34 in Chemical and Technical Dictionary (1947) and similarly in Chemical and Engineering Dictionary (both by Chemical Publishing Co.). The terms are likewise used interchangeably in Webster New Collegiate Dictionary (1951) (based on Webster's New International Dictionary); Winstons Simplified Dictionary, College Edition, 1938; and Practical Standard Dictionary, Funk and Wagnalls (1929), also the Merck Index 1952 Edition and others. These materials are likewise sold and used interchangeably under these several terms; the major portion of all of them being up to as high as 90% $SiO_2$ in the form of porous siliceous skeletal substances. Large deposits of these materials occur in various locations, e.g. California, Nevada, Oregon, etc. As with all naturally occurring materials, the $SiO_2$ content and impurities show variations within the general class as well as within the individual deposits. The terms kieselguhr, infusorial earth and diatomaceous earth and in general such naturally occurring porous siliceous materials will be used and referred interchangeably and on an equivalent basis in connection with the present invention. Tests on various such products showed comparable results within the variations which might be expected, i.e. the presence of other substances in varying amounts besides the porous siliceous materials in the several types. These with the higher amounts of porous silica are preferred.

The various well known phosphoric acids (ortho, pyro and meta) as well as those less well known phosphoric acids (such as tetra-phosphoric) all come within the scope of my invention. These phosphoric acids are related to each other in that they may be formed by successive dehydration steps and conversely they may be made from phosphorous pentoxide by successive additions of the proper amounts of water to $P_2O_5$. Also the latter may be added to various concentrations of phosphoric acid, e.g. from 75% to 85% and higher and the resultant mixture may be assumed (as has been done in the prior art "to contain free phosphorous pentoxide") that is to say that the latter has been added to the former. Alternatively the mixture may contain "a definite percentage of pyrophosphoric acid corresponding to the primary phase of dehydration of the orthophosphoric acid" or corresponding to the primary and secondary phases of hydration of the pentoxide. Meta phosphoric acid is also formed by the dehydration of ortho and pyrophosphoric acids or by the hydration of phosphorous pentoxide. Pyrophosphoric acid itself may be used at a temperature above its melting point of 140° F. but this is less desirable than the mixture. Therefore from the overall practical viewpoint and for convenience I prefer to use the orthophosphoric acid starting for example with the 85% commercial concentration (or diluting the latter as found desirable, e.g. from 75% to 85%) to which has been added various proportions of $P_2O_5$ (generally to a thick syrupy consistency); as found suitable or necessary simultaneously to incorporate the necessary amount of phosphoric acid in the mixture and to obtain a material of proper consistency prior to forming and baking. It is desirable to incorporate the maximum amounts possible of phosphoric acid which will produce a mixture which can be readily extruded and heated without flowing or undue deformation of the mixture during heating. Phosphorous pentoxide dissolves readily in orthophosphoric acid of commercial grade generally about 85% concentration particularly at elevated temperatures so that it is only a question of adjustment to obtain the desired concentration of the acid in the final product, e.g. about 80% or more by varying the concentration and amount of these two components, but of course the other components must also be adjusted.

In order to ascertain readily the amounts of phosphoric acid present in the mixture especially for comparison I determine the percentages on the basis of 100% orthophosphoric acid irrespective of the concentration present during mixing and of the form in which it may be present in the final product after heating.

The heavy stiff paste or mixture made by mixing the various materials including the additives i.e. the various compounds of iron referred to above; the porous silica material, i.e. the kieselguhr and the phosphoric acid may be formed into pellets or preferably by extrusion into suitable shapes and cut into proper sizes generally ⅛ to ¼" diameter and about ¼" length or otherwise formed, or the dried and baked material may be sized later.

The consistency of the mixture before drying may vary somewhat depending on the temperature of mixing, the relative proportions of the components including the specific additive, the kieselguhr and the relative amount and concentartion of phosphoric acid. It is desirable in all cases that the proportions of the materials be adjusted so that the mixture is stiff enough to be formed by extrusion and dried or baked without flowing or too much deformation. The application of a relatively small amount of heat at low temperatures, e.g. about 150° F. to 200° F. after mixing assists in congealing and thickening the mixture if necessary to permit forming, although this step may generally be avoided by proper formulation of all the components; and even by adjustment of any one of the components after mixing, by adding one or the other as required.

The formed catalyst may be dried and/or baked at temperatures varying from about 500° F. to about 650° F. and higher for several hours and upwards for example 4 hours, except where the phosphoric acid content of the catalyst is above about 78% in which case I may heat to temperatures of from 650° F. to 800° F. and above using the higher temperatures following the first stage or for most of the entire heating period. Preferably the heating is done in two stages, i.e. to about 200° F. to 250° F. for one half to three quarters hour and then to 600° F. to 650° F. for about 3½ to 4 hours. The same time schedule may be used for the higher temperatures. For some special cases, for example with very high acid contents of from 82 to 85%, I may employ temperatures progressively higher, for example from 800° F. to 900° F. (or higher as required) but generally the lower ranges suffice. However, there is a definite correlation of the composition of my catalysts with temperatures and time of heating. The prior art polymerization catalysts generally require a much greater period of prolonged heating at temperatures up to and above 900° F. In some cases in the very high temperature range, controlled rehydration of the baked catalysts may be desirable.

My invention thus produces a greatly superior product, more economically. It corrects vital deficiencies in respect of wearing qualities such as hardness and compression strength in the prior art catalysts while at the same time retaining the higher activity of the latter.

When used for polymerizing normally gaseous olefins, the granules or particles of catalyst are generally placed in treating towers and the gases containing olefins are passed downwardly through the towers at temperatures of 400° F. to 500° F. and pressures of several hundred pounds, e.g. 100 to 350 lbs. per square inch when employing stabilizer refluxes which contain e.g. 10 to 35% of propene and butenes. With gas mixtures containing normal and isobutene to obtain mixed polymerization the temperature may be lower, e.g. 250 to 350° F. with pressure of 500 to 800 lbs. per square inch, other reactions may be similarly carried out. It may also be desirable to introduce some steam during the reaction to maintain the normal vapor pressure of the catalyst; or the gas may be saturated with water vapor.

To remove carbonaceous or hydrocarbonaceous materials which form and deposit during the treatment the catalysts are reactivated by superheated steam and/or air or oxygen at temperatures varying from 500° to 1000° F. dependent on the concentrations of oxygen. The steam concentration may be increased toward the end of burning off period and then both steam and temperatures may be decreased towards the very end.

The specific examples shown in the table following are typical of the proportions of materials used and the properties of the resulting products although they should not be construed as limiting either as to specific materials or proportions within the broad scope and spirit of my invention.

made employing the Mohs mineral scale which is conventional in determining the relative hardness of minerals. The hardness and compression strength of a standard containing 80% phosphoric acid and 20% kieselguhr (with no additive present) made under similar conditions, i.e. heating the mixture up to about 650° F. for 4 hours showed a hardness of about 1 on the same scale and compression strength to 10 to 15.

Heating the standard to between 700° F. and 800° F. for an additional hour (and even longer) increased these values (of a standard) for hardness to about 1+ and the compression strength to about 35. However, much greater increases were shown when the samples from most of the runs, e.g. 5, 6 and 7 (shown in the table) were similarly treated showing improved response of my product to such treatment. On the other hand for similar treatments at lower temperatures my products are greatly superior.

In general increases in the amount of iron oxide up to about 3% of the total mix, and the temperature to 850° F. and in some cases above increased the compression strength and hardness. With regard to polymerization activity the conventional method for the polymerization of propylene under controlled and comparable experimental conditions may be employed. The catalysts shown in the table vary within several percent only from the standard (about 97% to 101.0% as compared to 100% for the standard) depending on the percentage of the additive being in the lower range with the maximum additive and minimum phosphoric acid content shown in the table and highest with the minimum additive which produces the desired improvement in compression strength and hardness and maximum phosphoric acid content.

EXAMPLES
TABLE

*Iron Oxide ($Fe_2O_3$) Additive*

|  | (1) | (2) | (3) | (4) | (5) | (6) | (7) [1] |
|---|---|---|---|---|---|---|---|
| Pts. by weight of $H_3PO_4$ | 72.0 | 72.0 | 72.0 | 73.0 | 75.0 | 75.0 | 78.5 |
| Pts. by weight of $P_2O_5$ | 40.0 | 40.0 | 40.0 | 40.0 | 42.0 | 42.0 | 44.0 |
| Equiv. of 100% $H_3PO_4$ | 116.6 | 116.6 | 116.6 | 117.3 | 122.0 | 122.0 | 127.7 |
| Percent of 100% $H_3PO_4$ | 78.0 | 79.0 | 79.5 | 79.5 | 79.0 | 80.0 | 80.5 |
| Pts. by weight of kieselguhr | 30.0 | 29.0 | 29.0 | 29.0 | 30.0 | 29.0 | 29.0 |
| Percent by weight of kieselguhr | 20.2 | 19.8 | 19.8 | 19.6 | 19.5 | 19.0 | 18.3 |
| Pts. by weight of additive | 3.0 | 2.0 | 1.2 | 1.5 | 2.5 | 1.5 | 1.5 |
| Percent of weight of additive | 2.0 | 1.4 | 0.7 | 1.0 | 1.6 | 1.0 | 1.0 |
| Total, percent | 100.2 | 100.2 | 100.0 | 100.1 | 100.1 | 100.0 | 99.8 |
| Relative hardness | 2.0 | 2.0 | 1.5 | 2.5 | 3.0 | 2.5 | 2.0 |
| Relative compression strength | 200 | 200 | 150 | 225 | 275 | 250 | 225 |

[1] No. 7 was repeated using 3.0 parts of iron oxide with additional improved results.
Note.—Preliminary heating of all products to 250° F. for about 1 hour; Nos. 1 and 2 were subsequently heated to 600° F. to 650° F. for about 4 hours; Nos. 3 and 4 were heated in the range of 700°F. to 750° F. for about 4 hours; and Nos. 5, 6 and 7 were heated in the range between 750°F. to 850° F for about 4 hours.

ADDITIONAL EXAMPLES

Tests corresponding to those shown in the above table were made employing both the phosphate and the sulphate of iron. The latter in the form of ferrous sulphate was added direct to the phosphoric acid. The compression strength and the hardness in the tests of both of these materials were less than those of the iron oxide. The phosphate was superior to the sulphate. However, these tests showed a marked improvement and were generally comparable to those in the table, e.g. the varying conditions gave different results.

The table shows the formulation and composition, and in addition illustrates the characteristics of my improved polymerization catalysts particularly with respect to structural or compression strength and hardness (resistance to abrasion) both of which are indexes of the wearing qualities and hardness. The structural or compressive strength tests represent the total thrust in pounds using the proving ring method on prepared representative specimens of fairly uniform size and shape (approximately ⅝" to ¾" cube) and represent the average of several comparative determinations on each type. The hardness data were The latter, of course, determines the activity. These values are consistent with reported data on a standard polymerization catalyst containing about 80% phosphoric acid and 20% kieselguhr. The generally assigned activity of the latter may vary dependent on conditions of the test but is reported about 80. Additional phosphoric acid in the catalyst incorporated in the mixture may exceed the standard, although small differences may be negligible from a practical viewpoint considering the greatly increased value as a result of greatly increased hardness and compression strength and of the greatly prolonged life of the catalysts produced according to my invention.

The general procedure for producing catalysts with activities higher than the standard is to increase the phosphoric acid contents by increasing both the $H_3PO_4$ and $P_2O_5$. The latter may be varied considerably as it readily dissolves in the 85% phosphoric acid on warming. The heavy liquid resulting from increased $P_2O_5$ permits a somewhat reduced proportion of kieselguhr or increased proportion of total phosphoric acid while at the same time maintaining proper workability of the mixture. For the higher phosphoric acid contents the iron compound additive should be between about 5% and 10% of the mineral mixture (kieselguhr and additive) or between 1% and 2% of the total; and the heating temperature should be increased as shown above, i.e. correlated with the phosphoric acid content.

It is, of course, necessary in these special cases to maintain a proper and fairly close balance in the relative amounts of the various components including the phosphoric acid, the phosphorous pentoxide, the bentonite, and kieselguhr in order to obtain an initial mixture that is workable, i.e. may be readily extruded and at the same time does not flow or deform on heating and which at the same time will produce the desired hardness and compression strength while maintaining the activity of the final product. In carrying out these formulations the sequence of mixing is a factor and as I have previously observed that the mixture responds better when the iron oxide, or phosphate is mixed with kieselguhr while soluble salts like the sulphate are added direct to the mixture.

At the other end of the scale, I may when desired, increase the kieselguhr content of the catalyst or the additive or both and reduce the phosphoric acid content, e.g. from 60 to 75° (or more) to make a catalyst of lower activity but otherwise of very high compression strength and hardness. The lower range of the special type represents a type which might be used only in very special cases, but the upper range, e.g. from 70% to 78% $H_3PO_4$ might find considerable use, e.g. in alkylation. However, the ranges between 78% and 82% $H_3PO_4$ (with corrections for additive) are preferred as these would be most widely employed for normal operations of polymerizing olefin gases to produce high octane motor fuels.

It is also to be emphasized that, while not the most desirable procedure, adjustments in proportions of the components may be made after the initial mixture is made to develop certain desired properties.

It will be understood that there are many variations in initial concentrations of phosphoric acid, the percentages and amounts of phosphorous pentoxide which may be incorporated therein as well as the quality and proportions of kieselguhr and of the additive required to give a mixture of the proper consistency to allow extrusion and to be heated without deformation or flowing of the material being heated; and at the same time to produce the requisite properties of activity, hardness and compression strength.

It is to be further understood that some reaction may occur between the additives employed herein and the phosphoric acid, and therefore by the term additive as used in the claims I include the additives as such and/or their reaction products in terms of the amounts or percentages of additives used and referred to as such.

I claim:

1. A polymerization catalyst comprising a dried mixture of a phosphoric acid and an inorganic support, said support consisting essentially of a natural porous silica material selected from the class consisting of kieselguhr, infusorial earth and diatomaceous earth and an additive selected from the group consisting of inorganic compounds of iron, the said phosphoric acid comprising about 70% to 85% of the said mixture, said support containing not less than about 80% of the said porous silica material and less than about 20% and more than 1% of said additive, said support being further characterized in that the said porous silica material together with said additive comprises not more than about 30% of the mixture.

2. A polymerization catalyst comprising a dried mixture of a phosphoric acid and a mineral support, said support consisting essentially of a material selected from the class consisting of kieselguhr, infusorial earth and diatomaceous earth and an additive consisting essentially of an oxide of iron, the said phosphoric acid comprising about 75% to 85% of the said mixture, said support containing not less than about 80% of the said material selected from the class consisting of kieselguhr, infusorial earth and diatomaceous earth and less than about 20% and more than 3% of said additive, said support being further characterized in that the said material selected from the class consisting of kieselguhr, infusorial earth and diatomaceous earth together with said additive comprises not more than about 25% of the mixture.

3. A polymerization catalyst comprising a dried mixture of a phosphoric acid and a mineral support, said support consisting of a material selected from the class consisting of kieselguhr, infusorial earth and diatomaceous earth and an additive consisting essentially of a phosphate of iron, said phosphoric acid comprising about 75% to 85% of the said mixture, said support containing not less than about 80% of the said material selected from the class consisting of kieselguhr, infusorial earth and diatomaceous earth and less than about 20% and more than about 3% of said additive, said support being further characterized in that the said material selected from the class consisting of kieselguhr, infusorial earth and diatomaceous earth together with said additive comprises not more than about 25% of the mixture.

4. A polymerization catalyst comprising a dried mixture of a phosphoric acid and a mineral support, said support consisting of a material selected from the class consisting of kieselguhr, infusorial earth and diatomaceous earth and an additive consisting essentially of a soluble salt of iron, said phosphoric acid comprising about 75% to 85% of the said mixture, said support containing not less than about 80% of the said material selected from the class consisting of kieselguhr, infusorial earth and diatomaceous earth and less than about 20% and more than about 3% of said additive, said support being further characterized in that the said material selected from the class consisting of kieselguhr, infusorial earth and diatomaceous earth together with said additive comprises not more than about 25% of the mixture.

5. An improved polymerization catalyst comprising a dried mixture of a phosphoric acid and an inorganic support, said support consisting essentially of a porous natural silica material selected from the group consisting of kieselguhr, infusorial earth and diatomaceous earth and of an additive selected from the group consisting of inorganic compounds of iron, the said additive being present in an amount of about 3% to 20% of the said inorganic support and less than about 10% of the total mixture, the said phosphoric acid comprising about 75% to about 85% of the total mixture and the remaining component of the said catalyst consisting essentially of said porous natural silica material.

References Cited in the file of this patent

UNITED STATES PATENTS

| 2,060,871 | Ipatieff | Nov. 17, 1936 |
| 2,300,123 | Keunecke et al. | Oct. 27, 1942 |
| 2,367,877 | Layng | Jan. 23, 1945 |
| 2,524,865 | Winslow | Oct. 10, 1950 |
| 2,704,747 | Bielawski | Mar. 22, 1955 |